United States Patent [19]
Langhans et al.

[11] Patent Number: 5,621,201
[45] Date of Patent: *Apr. 15, 1997

[54] AUTOMATED PURCHASING CONTROL SYSTEM

[75] Inventors: Stephen Langhans, San Francisco; Laurence M. Goodman, Foster City; Sigman L. Shapiro, Alamo, all of Calif.

[73] Assignee: Visa International, Foster City, Calif.

[ * ] Notice: The term of this patent shall not extend beyond the expiration date of Pat. No. 5,500,513.

[21] Appl. No.: 597,050

[22] Filed: Feb. 5, 1996

Related U.S. Application Data

[63] Continuation of Ser. No. 241,106, May 11, 1994, Pat. No. 5,500,513.

[51] Int. Cl.$^6$ .................................................. G06K 5/00
[52] U.S. Cl. ........................................ 235/380; 395/238
[58] Field of Search ..................... 235/380; 340/825.33; 364/408

[56] References Cited

U.S. PATENT DOCUMENTS

| | | | |
|---|---|---|---|
| 4,727,243 | 2/1988 | Savar | 235/379 |
| 4,812,628 | 3/1989 | Boston et al. | 235/380 |
| 4,891,503 | 1/1990 | Jewell | 340/825.33 |
| 5,177,342 | 1/1993 | Adams | 340/825.33 |

FOREIGN PATENT DOCUMENTS

| | | | |
|---|---|---|---|
| 2118341 | 10/1983 | United Kingdom | 235/380 |

*Primary Examiner*—Donald T. Hajec
*Assistant Examiner*—Jeffrey R. Filipek
*Attorney, Agent, or Firm*—Townsend and Townsend and Crew LLP

[57] ABSTRACT

An automated purchasing control system which can be customized for a corporate customer. The system receives an authorization request over the phone lines from a remote point-of-sale terminal and processes the request using unique software. The software has a database customized to a corporate user to establish that company hierarchial structure. Elements of the hierarchial structure are independently reconfigurable, so that a company can specify different hierarchial relationships in the software for authorization, billing and reporting purposes. Different authorization tests can be established for each position in a hierarchy, with a particular position being required to pass not only its own test, but the test of elements higher in the hierarchial tree.

14 Claims, 9 Drawing Sheets

| ⌐10 | ⌐12 | ⌐14 | ⌐16 |
|---|---|---|---|
| ACCOUNT NO. | AUTH. LEVEL 8 | BILLING LEVEL 8 | REPORTING LEVEL 8 |

| ⌐18 | ⌐20 | ⌐22 | ⌐24 |
|---|---|---|---|
| TEST NO. | PARAMETERS | TEST NO. | PARAMETERS |

*FIG. 5.*

| ⌐26 | ⌐28 | ⌐30 | ⌐32 |
|---|---|---|---|
| LEVEL 3 GROUP | AUTH. LEVEL 2 | BILLING LEVEL 2 | REPORTING LEVEL 2 |

| ⌐34 | ⌐36 | ⌐38 | ⌐40 |
|---|---|---|---|
| TEST NO. | PARAMETERS | TEST NO. | PARAMETERS |

| ⌐42 | ⌐44 | ⌐46 | ⌐48 |
|---|---|---|---|
| LEVEL 9 ACCT. 1 AUTH. | LEVEL 9 ACCT. 1 BILL. | LEVEL 9 ACCT. 1 REPORT | LEVEL 9 ACCT. 2 AUTH. |

AUTOMATED PURCHASING CONTROL SYSTEM

This is a Continuation, of application Ser. No. 08/241,106 filed May 11, 1994, now U.S. Pat. No. 5,500,513.

BACKGROUND OF THE INVENTION

The present invention relates to computer systems for automatic control of purchasing, in particular using credit cards.

Figure 1:
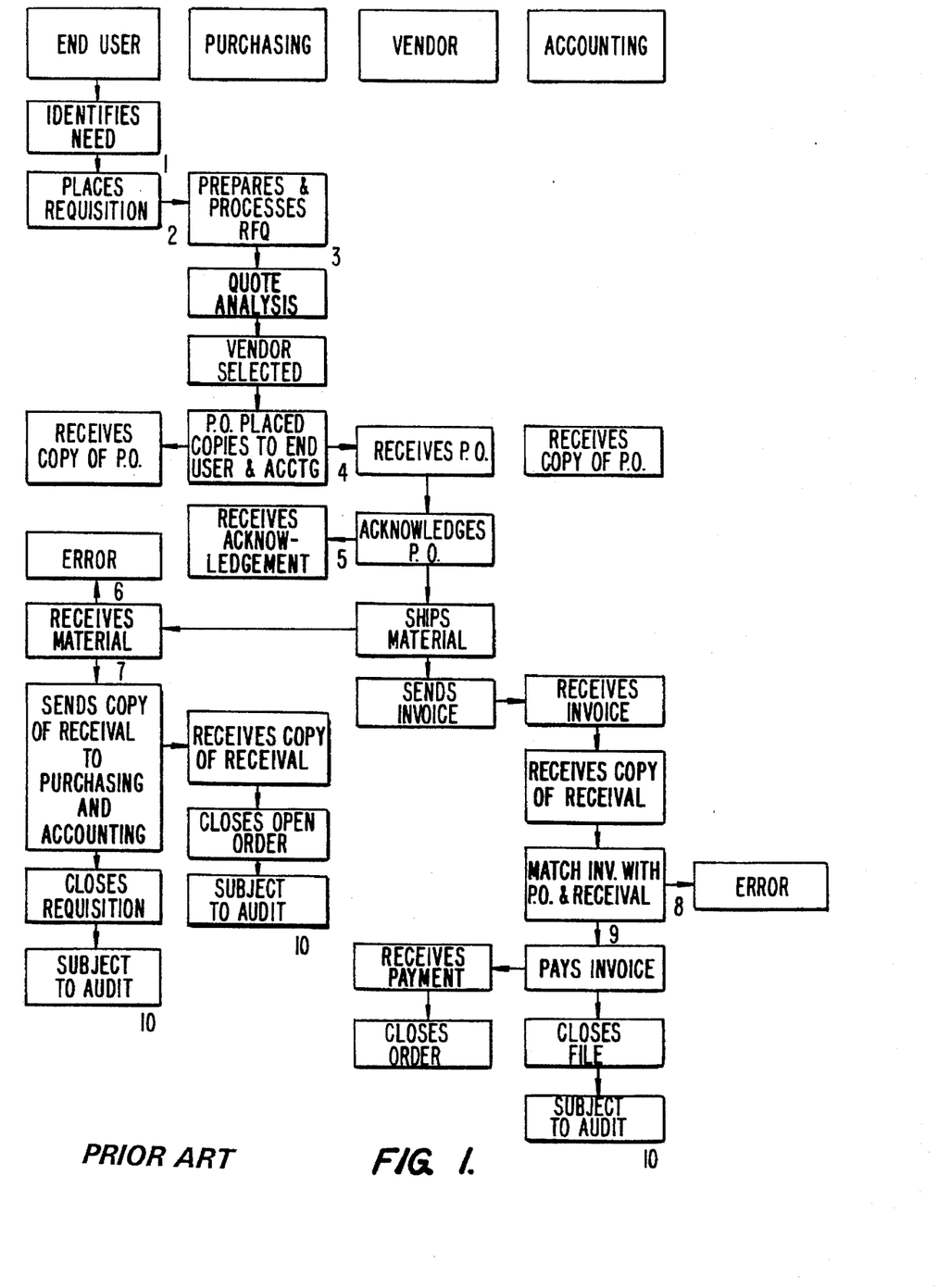
FIG. 1 is a flowchart illustrating a prior art paper based purchasing process.

The typical purchasing system at a large company (e.g., a corporation) can be very complex, with the involvement of a number of employees at different points in the process, and the generation of a large amount of paper. FIG. 1 is a process flow chart illustrating the steps required from start to finish for a typical corporate purchase order. The approval process in a typical company involves a number of corporate controls. A particular purchase for materials or services must be approved for that particular department and also meet budgetary restraints for the particular department. These needs may vary from project to project. In addition, the company may have certain approved vendors which are required to be used for certain purchases.

A purchasing card for government functions has been developed by Rocky Mountain BankCard. The card, which is used like a credit card, can be used to charge purchases. The card user is assigned a card number identifying where in the government hierarchy that employee falls. A budget limit for a department can be applied through the hierarchy to an individual purchase authorization request by the cardholder. The hierarchial system for the Rocky Mountain BankCard which allows different budgetary limits by department can also be used for the billing and reporting purposes. Thus, the government can limit spending by cardholders and receive reports and billings which match the agency's departmental structure.

Another system similar to the Rocky Mountain BankCard system has also been used by Pro Card. Both these systems also incorporate a merchant blocking feature, which prohibits purchases from certain types of merchants. When a card is used, the merchant uses a point-of-sale device to transmit the card number to a central bank for authorization. In addition to the card number, a merchant code (i.e., SIC code) identifying the merchant category is transmitted. The merchant code will identify the type of merchant involved. Thus, for example, it would be possible for the purchasing card holder to be allowed to purchase airline tickets, but not jewelry.

Usage monitoring to detect fraud or fraud patterns is desirable from a bank's perspective. Banks incorporate features in administering a credit card system which allows them to monitor usage. For example, banks can obtain reports showing usage in a particular geographic area, or usage for particular types of merchants, and compare these to the incidents of reported fraud. One useful test is that of "velocity checking." Velocity checking involves determining how often a card is used within a particular time period. Such a check could, for example, uncover fraudulent activity, although this may be hard to distinguish from non-fraudulent cardholder activity.

SUMMARY OF THE INVENTION

The present invention provides an automated purchasing control system which can be customized for a business customer. The system receives an authorization request over the phone and data lines from a remote point-of-sale terminal and processes the request using unique software. The software has a database customized to a business user to establish that business's hierarchial structure. Elements of the hierarchial structure are independently reconfigurable, so that a company can specify different hierarchial relationships in the software for authorization, billing and reporting purposes. Different authorization tests can be established for each position in a hierarchy, with a particular position being required to pass not only its own test, but the test of elements higher in the hierarchial tree.

An example of the benefits of the present invention is that a salesperson could be allowed a velocity checking limit for the category of hotels at a high frequency level, while an accounting clerk with no reason to travel could be allocated a lower velocity level, or allocated no authorization for hotels at all. The purchase reports for the salesperson could be put on a report which is organized in a different hierarchial way than the authorization hierarchy. For instance, the purchase reports may go to a special project the salesperson is working on, while the authorization will be in accordance with that salesperson's normal department. The present invention thus allows a company's expense and purchasing controls to be automated and implemented without human intervention through the use of purchasing or credit cards. The system takes advantage of the existing credit card networks which are adapted to serve the functions of the invention.

The present invention merges a company's purchasing control system with a credit card authorization system to produce a real-time purchasing authorization and control system. The software and databases are structured to provide an automated electronic implementation of company limits and business approval processes, with a dynamic, overlapping hierarchial structure, while approving or disapproving purchases by employees in real-time at the time of purchase. The entire purchasing process is re-engineered, and made a paperless process requiring no human intervention.

The present invention also allows a company to group merchant category codes in order to limit purchases to those merchant types which would be needed by a particular department or individual. This automatically implements that company's purchase control system which would require certain types of vendors to be used for certain goods or services. This approved vendor grouping more closely matches a company's normal process than the merchant blocking of all undesired vendors used in prior art systems.

The present invention has an approved vendor list feature which provides companies with the capability to create an approved vendor list to restrict and consolidate spending to specific merchants. Based on a comparison of the vendor data stored in an electronic approved vendor list and the merchant information transmitted from the point-of-sale in the authorization request, a purchase will be approved if the merchant data in the authorization request matches vendor information on the approved vendor list, or it will be declined if there is no match.

In operation, the system of the present invention uses credit cards which have encoded on them a unique card number. This card number would include the individual account number, plus a bank identification number (BIN) which identifies the card as one designated for a purchasing control system. When the user makes a purchase, either in person or over the telephone, and the merchant passes the card through a point-of-sale (POS) device or terminal, the card number is transmitted over a credit card authorization system, such as the Visa system, to a remote central computer. The computer will detect that the BIN number is one indicating a purchasing control system, and direct the authorization request to the centralized purchasing control computer system. This system will then look up the account number and identify the hierarchial position of the account number. The appropriate test for that account number will be identified and applied, along with tests of other elements higher in the hierarchy under which that account number falls. After the tests are performed, the computer will, depending upon the company's customized programming, generate a signal indicating the authorization request is either allowed or denied. If a particular test is failed, the system may simply generate a report item rather than a failure to authorize, depending upon how the system has been customized for the company.

For a further understanding of the nature and advantages of the invention, reference should be made to the ensuing description in conjunction with the accompanying drawings.

DESCRIPTION OF THE PREFERRED EMBODIMENT

Figure 2:
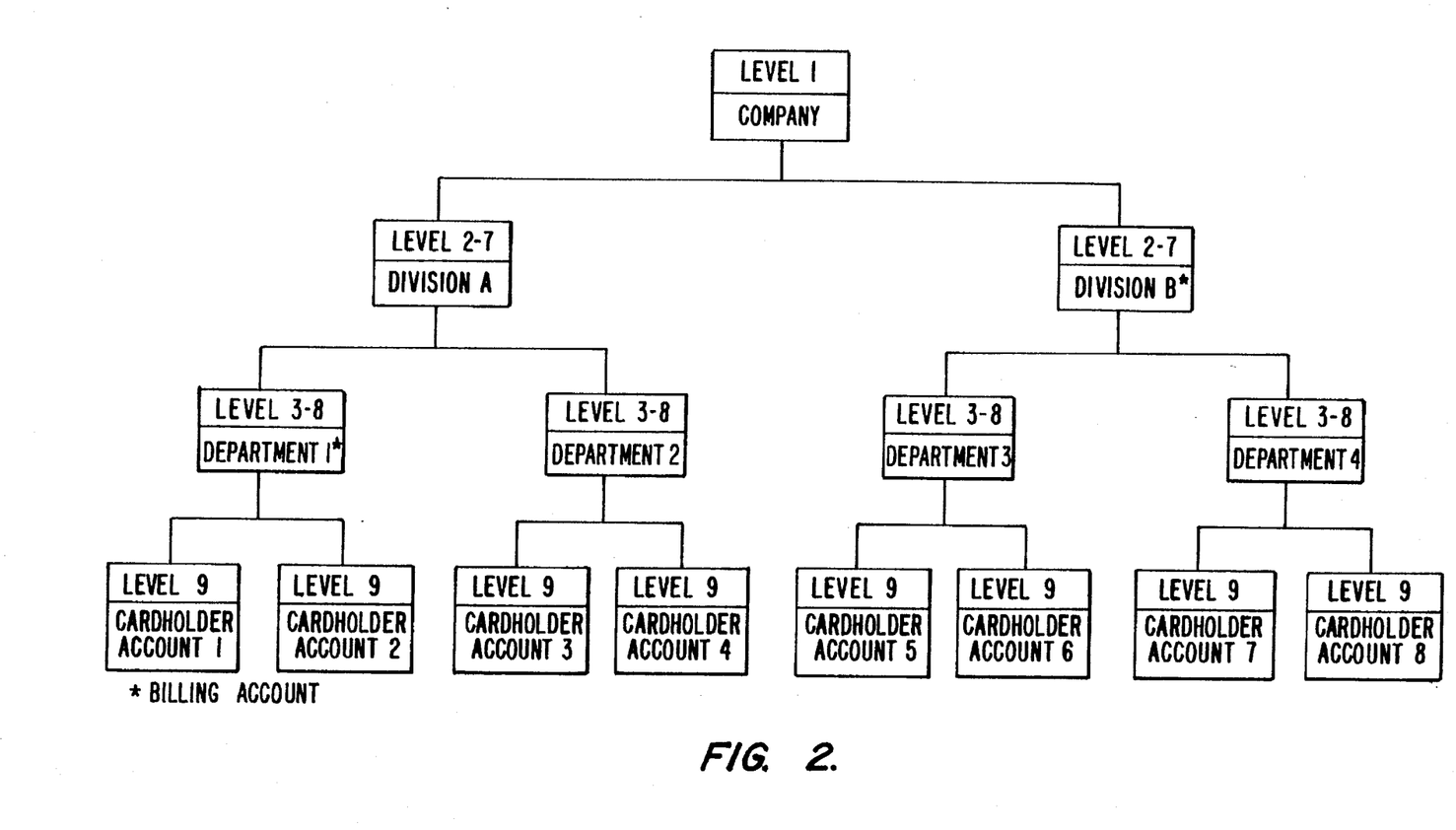
FIG. 2 is a chart of a hierarchial company account according to the present invention.

A description of the database structure used by the present invention will facilitate an understanding of the invention. FIG. 2 is a chart showing a company's hierarchial departmental structure. The chart in FIG. 2 is also the format presented on a computer screen for a company employee to set up the desired hierarchial database for use in the automated purchasing control system of the present invention. The different boxes can be labeled and provided with the appropriate tests and test parameters.

The level 1 box identifies the company in the database structure. Below that, levels up to a level 9 are allowed to show divisions, departments, etc. The level 9 level is designated as the individual cardholder account level, corresponding to the physical card held by an individual employee. Between the cardholder level 9 and the company level 1, up to seven levels may be specified by the company's structure.

Once the basic company structure has been set out, separate hierarchies may be indicated for different purposes. For instance, the structure of FIG. 2 could be used for designating billing accounts, as shown by the asterisk. Only the departments or divisions having an asterisk are to receive a billing report for the levels beneath them.

Figure 3:
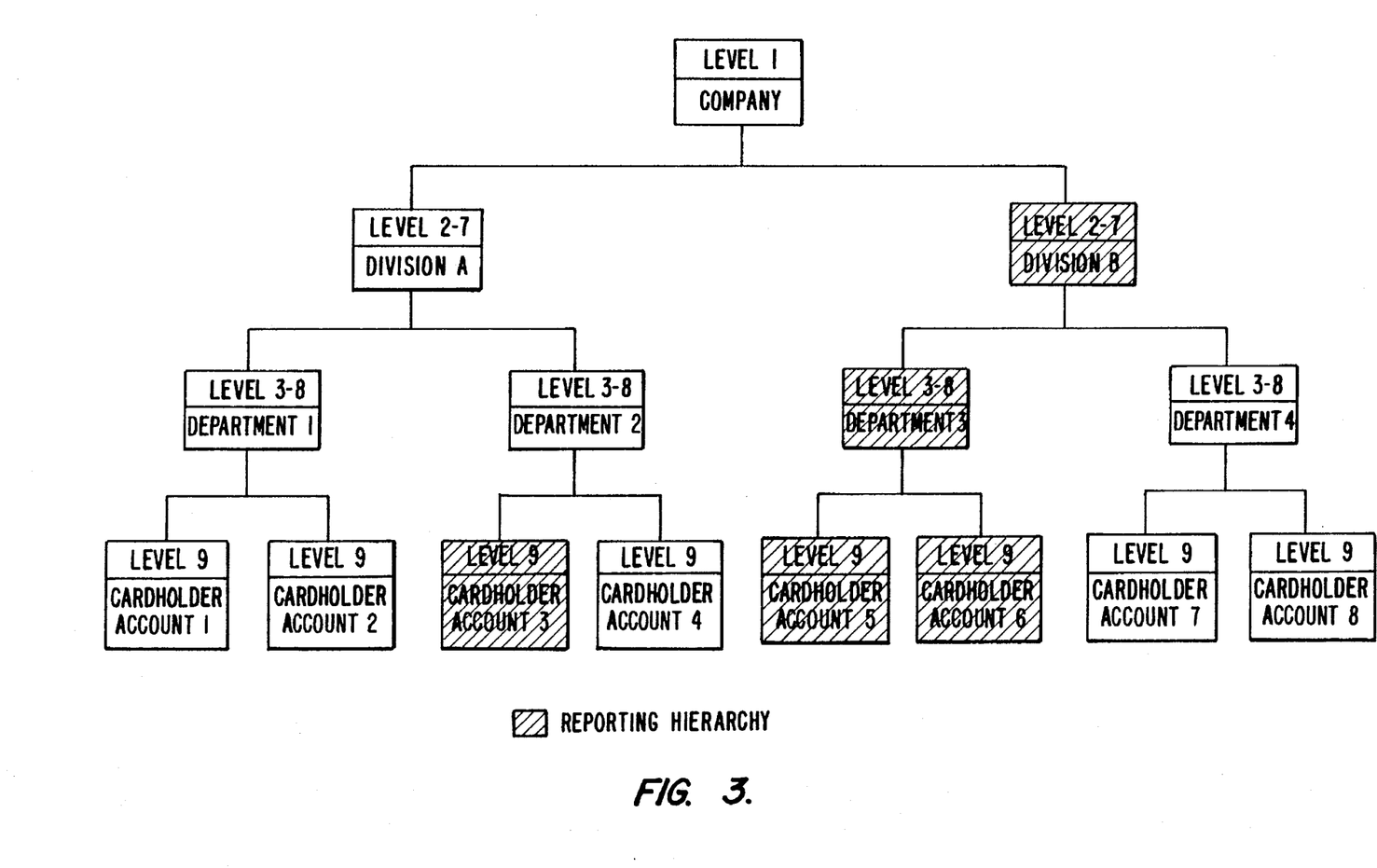
FIG. 3 is a chart of the hierarchy of FIG. 2 modified for reporting.

As shown in FIG. 3, a separate hierarchy could be designated for reporting purposes. In this example, division B is given a report indicating department 3, but not department 4. Department 3 will include, at level 9, accounts 5 and 6, which is entered in the company's organizational structure of FIG. 2, plus account number 2, which may be assigned to department 3 for reporting purposes. Thus, the company can independently configure the reporting hierarchy from the billing hierarchy. This can be done by a pointer in the account database for cardholder account number 3, which points to department 3 for reporting purposes, while pointing to department 2 for billing purposes, for instance.

Figure 4:
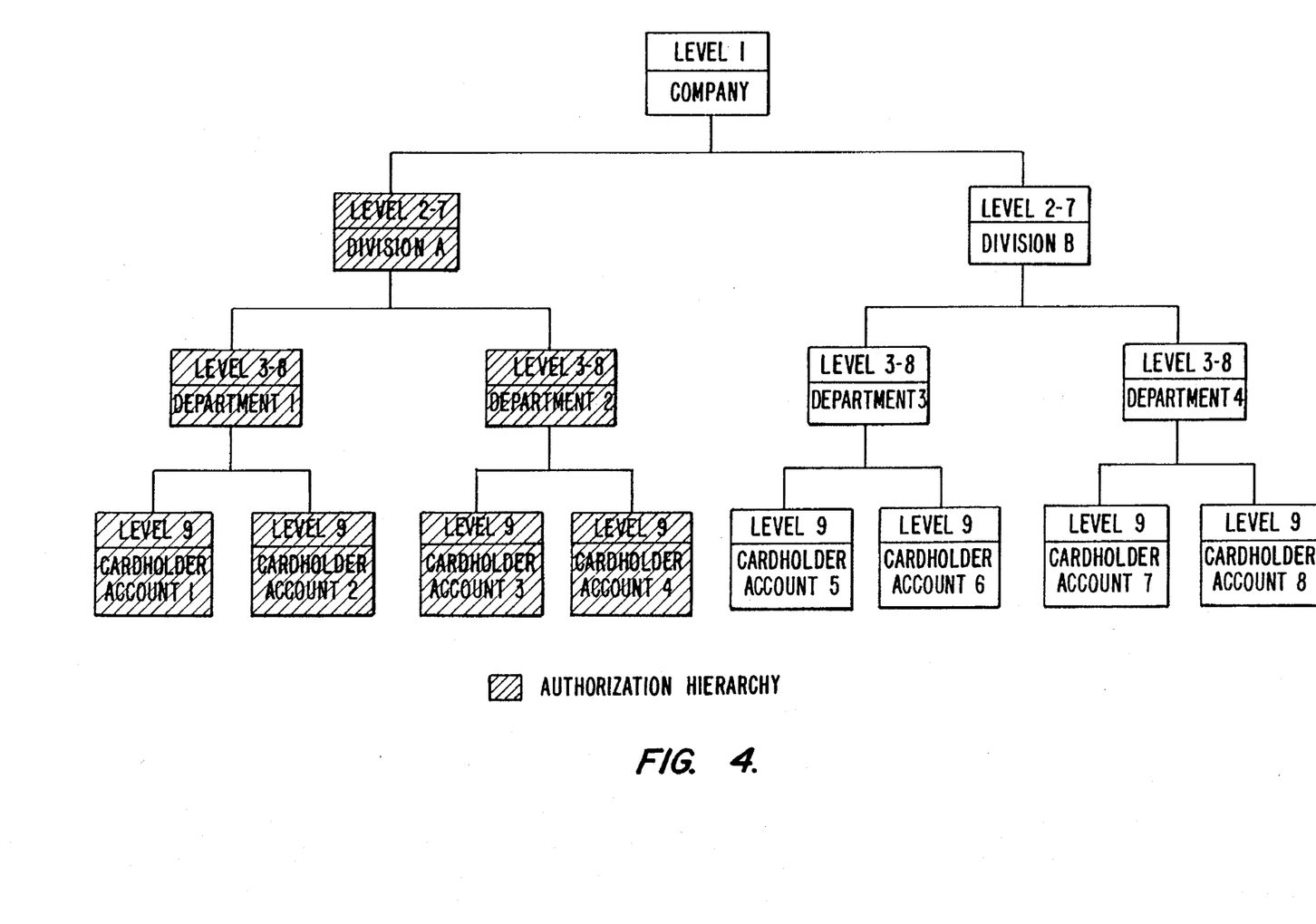
FIG. 4 is a chart of the hierarchy of FIG. 2 modified for authorization.

FIG. 4 illustrates yet another hierarchy which might be used for authorization purposes. In this instance, the hierarchy grouping for authorization purposes is different from the reporting grouping.

Figure 5:
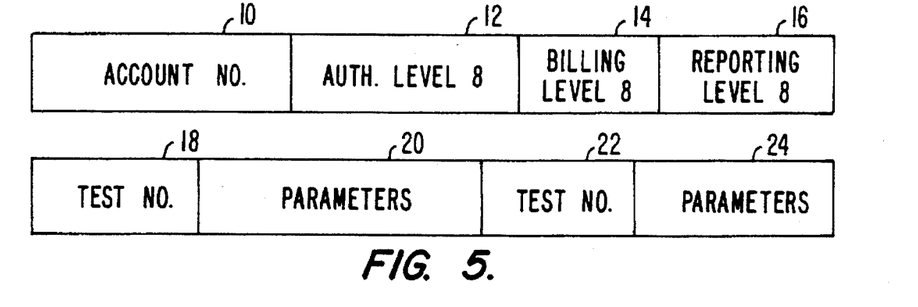
FIG. 5 is an illustration of the database parameters for an account number at the cardholder level.

FIG. 5 illustrates a database entry for a particular cardholder account number. A first field 10 contains the individual cardholder account number. A second field 12 is a pointer to the next level up for authorization purposes. Field 14 is a pointer to the next level up for billing purposes, and field 16 is a pointer to the next level up for reporting purposes. These fields are followed by a pointer or subroutine call to a first authorization test 18, along with the parameters for that test 20. An additional test pointer 22 is shown, along with its parameters 24. Further tests are used, but are not shown, in order to keep the illustration simple.

In one embodiment, when authorization is performed, the pointer is pointed to another portion of the database where the tests for the next level up may be found. Thus, the test for the account number level can be found and used, while separately an additional read can be done to determine the test for that particular department, division, etc., by going to the stored test at the location pointed to by the pointer.

In an alternate embodiment, in order to make the authorization process faster by requiring fewer reads, the pointer may be used for configuring the database only, with the actual tests for each level up in the hierarchy being stored along with account number 10. Although this consumes additional storage space by duplicating the department tests, all relevant tests and parameters are stored at a single location.

In yet another embodiment, instead of storing multiple tests for each level hierarchy for the particular account number, the tests are combined. When the database is configured, there may be, for instance, a maximum limit set forth at multiple levels in the hierarchy. The particular account number will simply use the limiting one of these limits (presumably the lowest level for a maximum) as the parameter for the limit test. In this way, authorization is expedited by not only locating the relevant test and parameters in one location, but requiring a single test rather than multiple tests be run in real-time. Thus, additional efforts spent in configuring the database improves real-time performance of the authorization process. This real-time speed is important for a customer waiting at a merchant location for credit card authorization.

As can be seen, such a system provides a real-time purchasing control system, as opposed to the prior art system shown in FIG. 1, which requires either cash advances ahead of time or requisitions and purchase orders subsequent to the time of actual purchase. The present invention, by combining the credit card network system with a uniquely configured database and operating software allows the merger of the company's purchasing control system, having multiple overlapping hierarchies, with a credit card authorization system to produce a real-time purchasing authorization and control system.

Figure 6:
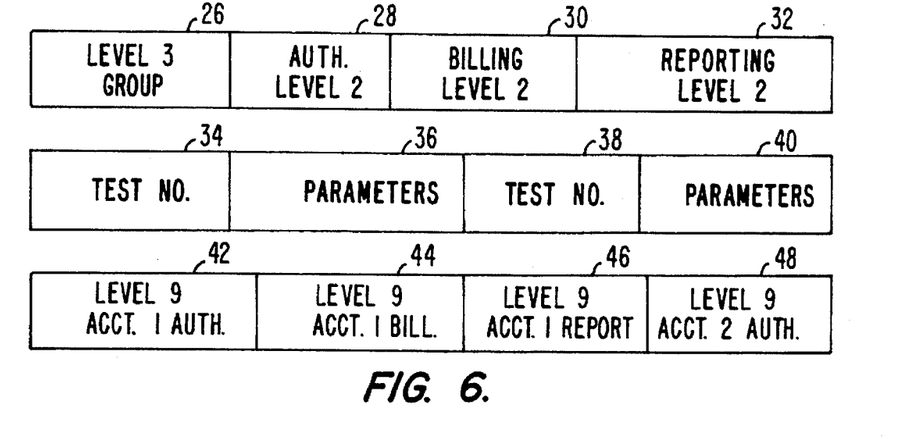
FIG. 6 is a diagram of the database entry for an intermediate level in the hierarchy.

FIG. 6 illustrates a database entry in one embodiment for a mid-level authorization group indicated in a field 26. This group may have its pointers to the next level up for authorization in a field 28, for billing in a field 30, and for reporting in a field 32. Similarly to an individual account number, it will have its own test number 34 with associated parameters 36. An additional test 38 with its parameters 40 is also illustrated.

As discussed above, in one embodiment, the database entry of FIG. 6 is configured by the company ahead of time for control purposes, but it not used in real-time in the authorization process. This is possible because after the parameters in the database fields of FIG. 6 have been set forth, the system will use the pointers and parameters to configure the fields of the individual account numbers shown in FIG. 5. This alignment of the system is self-correcting, such that if the position in the hierarchy is changed for any purpose, such as the billing level in field 30 is modified, the pointers in both directions will cause the change to ripple through related hierarchial components.

Because FIG. 6 illustrates a mid-level position, it not only has pointers to the next level, but additionally has pointers, in one embodiment, to all levels below it, as illustrated by fields 42, 44, 46 and 48.

Figure 7:
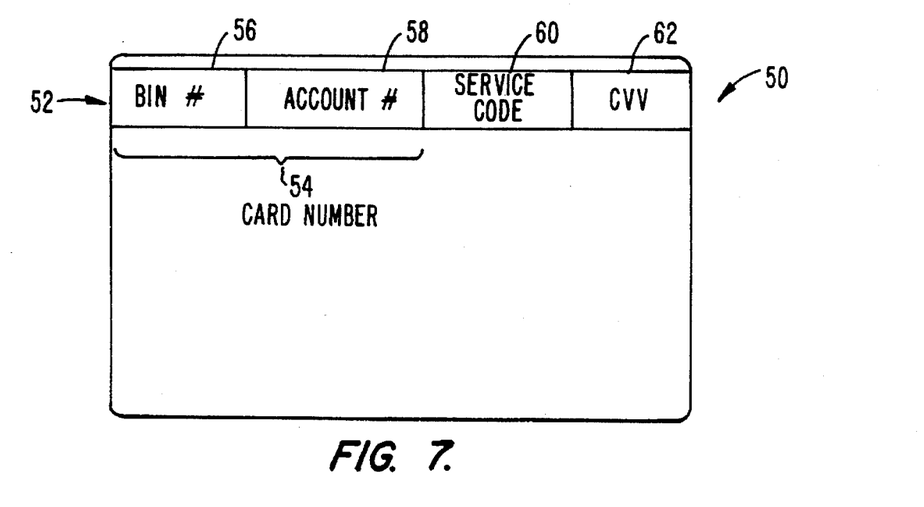
FIG. 7 is an illustration of a card encoded according to the present invention.

FIG. 7 illustrates a physical card encoded according to the present invention. The card 50 includes a magnetic strip 52. Magnetic strip 52 includes a card number 54 composed of a BIN number 56 and account number 58. The BIN number is a Bank Identification Number which not only identifies the issuing bank, but also identifies the type of card issued. For the present invention, the BIN number would indicate the issuer and the fact that this is an automatic purchasing control card according to the present invention. This designation will indicate, when the card is read, that the database and software in a particular computer used by the present invention must be located and accessed for authorization. The individual account number 58 corresponds to account number 10 in FIG. 5 combined with a separate number indicating the company to which account number 10 belongs. This is contrast with a typical credit card, in which the account number simply identifies the individual cardholder account.

Another number on the strip is a service code 60 which can identify the particular type of card being used. For instance, it may identify that the card is a purchasing card, or a travel and entertainment card for a particular company. Alternately, the code could also indicate that the card is a cash only use card, or a card for debits for purchase at a merchant site in a point-of-sale (POS) device. Finally, a card verification value (CVV) 62 is used for error detection and fraud detection.

Figure 8:
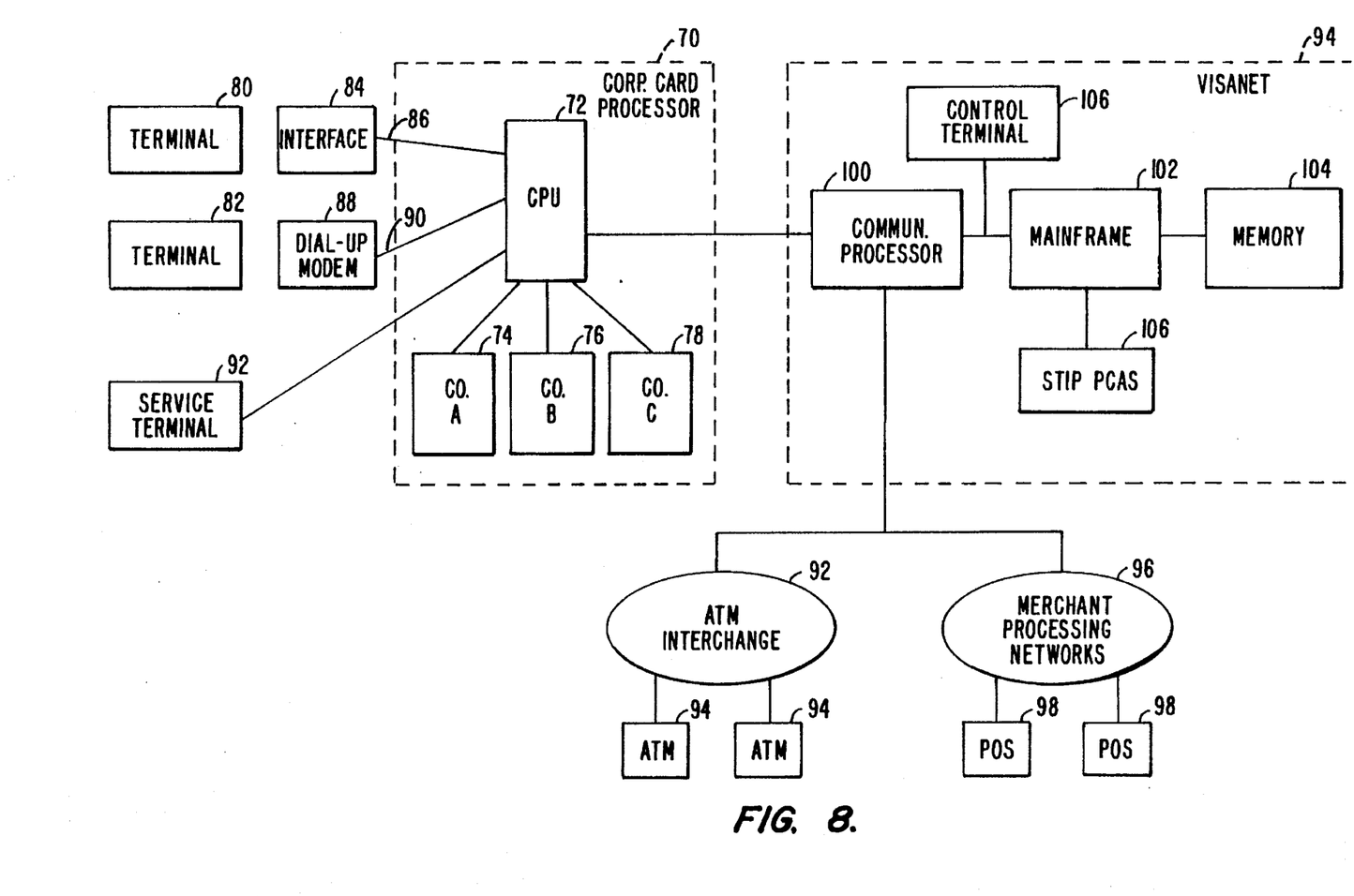
FIG. 8 is an illustration of a network according to the present invention.

FIG. 8 is a block diagram of a system for implementing the present invention. A corporate card processor system 70 is shown, with its own CPU 72. The CPU has data storage which can be divided up into individual company accounts 74, 76, and 78. A pair of remote accessing terminals 80 and 82 are shown. First terminal 80 may be connected to processor 72 through an interface 84 over a communication line, such as Digital T-1 line 86. Terminal 82 might be connected, instead, over a dial-up modem 88 and a public packet-switched network communication link 90 to CPU 72. These terminals could be used by bank employees configuring the account, or be used directly by a corporate customer to provide the configuration, which could then be verified by bank or other personnel before being entered into the system and activated. A separate service terminal 92 is also shown for maintenance of the CPU 72.

Corporate card processor 70 is connected to a network, such as a VisaNet network 94. VisaNet network 94 can be connected to a merchant processing network 96, for instance, which would be connected to individual point-of-sale devices 98. Point-of-sale devices 98 would be located at individual merchant locations, and would receive a corporate or purchasing card according to the present invention and transmit the encoded card information along with the merchant identifying information to VisaNet network 94. An ATM network 93 is connected to ATMs 95, which can be considered a merchant type. The ATMs have a merchant code, and are used for cash advances.

The VisaNet network 94 can be configured to have a central computer with a communication processor 100. This could be, for instance, an IBM 3745. The communication processor is connected to a mainframe 102. One such mainframe would be the IBM 3090. Local memory 104 provides storage for mainframe 102. A control terminal 106 allows local access for servicing and control of the VisaNet network.

In operation, a credit card authorization request for a corporate card received by VisaNet network 94 would be identified from the BIN number as a corporate card, and the authorization request would be transmitted to corporate card processor 70 for authorization.

In the event that processor 70 is unavailable for any reason, the VisaNet system includes stand-in processing (STIP) software 106, which can be used when the corporate card processor is not available. This STIP software includes positive cardholder identification service (PCAS) software which can do card number verification, PIN verification and balance verification, if desired. This provides a real-time backup to insure that an authorization request is responded to in real-time, even though the tests are limited.

Figure 9:
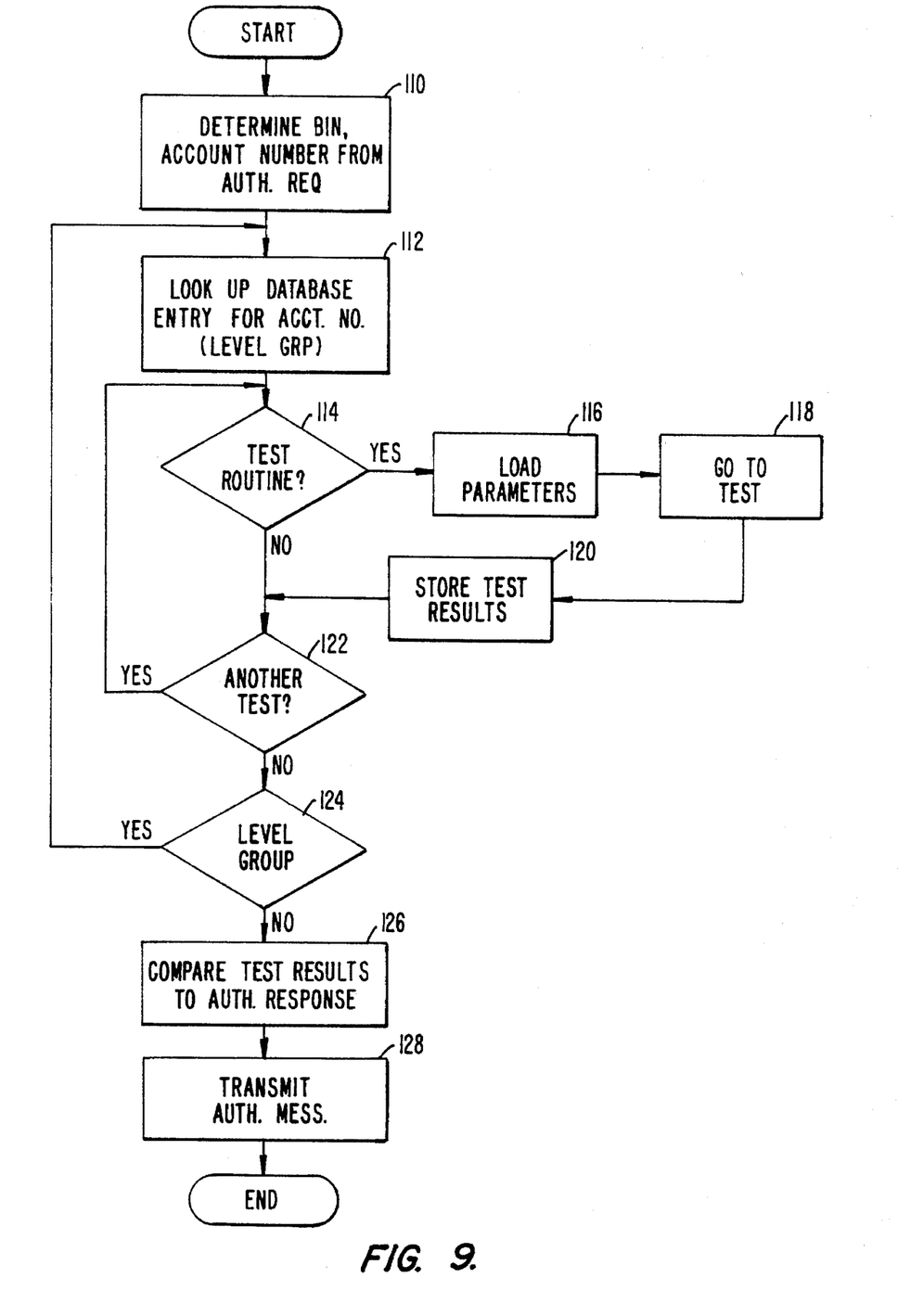
FIG. 9 is a flowchart of the authorization software of the present invention.

FIG. 9 is a flowchart illustrating the operation of the corporate card processor software for responding to an authorization request. First, from the BIN number, it can be determined that it is a corporate card as indicated in step 110. The corporate account number can be determined from the card number transmitted along with the message. From this card number, the software identifies a particular company account (Account 74, 76 and 78 in FIG. 8). The database entry for the individual account number is then retrieved (step 112). This would be, in one embodiment, an account record such as is shown in FIG. 5. The account record would be examined to determine if there are any test routines (step 114). If a test is identified, the parameters from the database are loaded into the appropriate register of the processor, and the test routine pointed to (by address 18 in FIG. 5) is fetched and executed (step 118). The test results are stored (step 120) both for authorization purposes and for later report generation. The database is then examined to determine if there is another test, such as test 22 in FIG. 5 (step 122). If there is such another step, the process is repeated for the second test.

After all the tests for a particular account number are completed, in one embodiment, the routine will check for pointers to a different authorization level (step 124). If there are such pointers for test purposes, the process is repeated for that level, starting with step 112 in locating the database entry for that level, such as the entry shown in FIG. 6. In an alternate embodiment, all the tests of the other level have been combined with the test routines for the particular account number.

When the tests are completed, the test results are compared to the authorization response indicated by the company (step 126). For instance, a company may indicate that a test failure requires the purchase to not be authorized. Alternately, the purchase could be authorized, but a report could be generated indicating that certain limits have been exceeded. The appropriate response is then transmitted (step 128) from the corporate card processor 70 to VisaNet 94, and from there through the network 96 to the originating POS 98.

Figure 10:
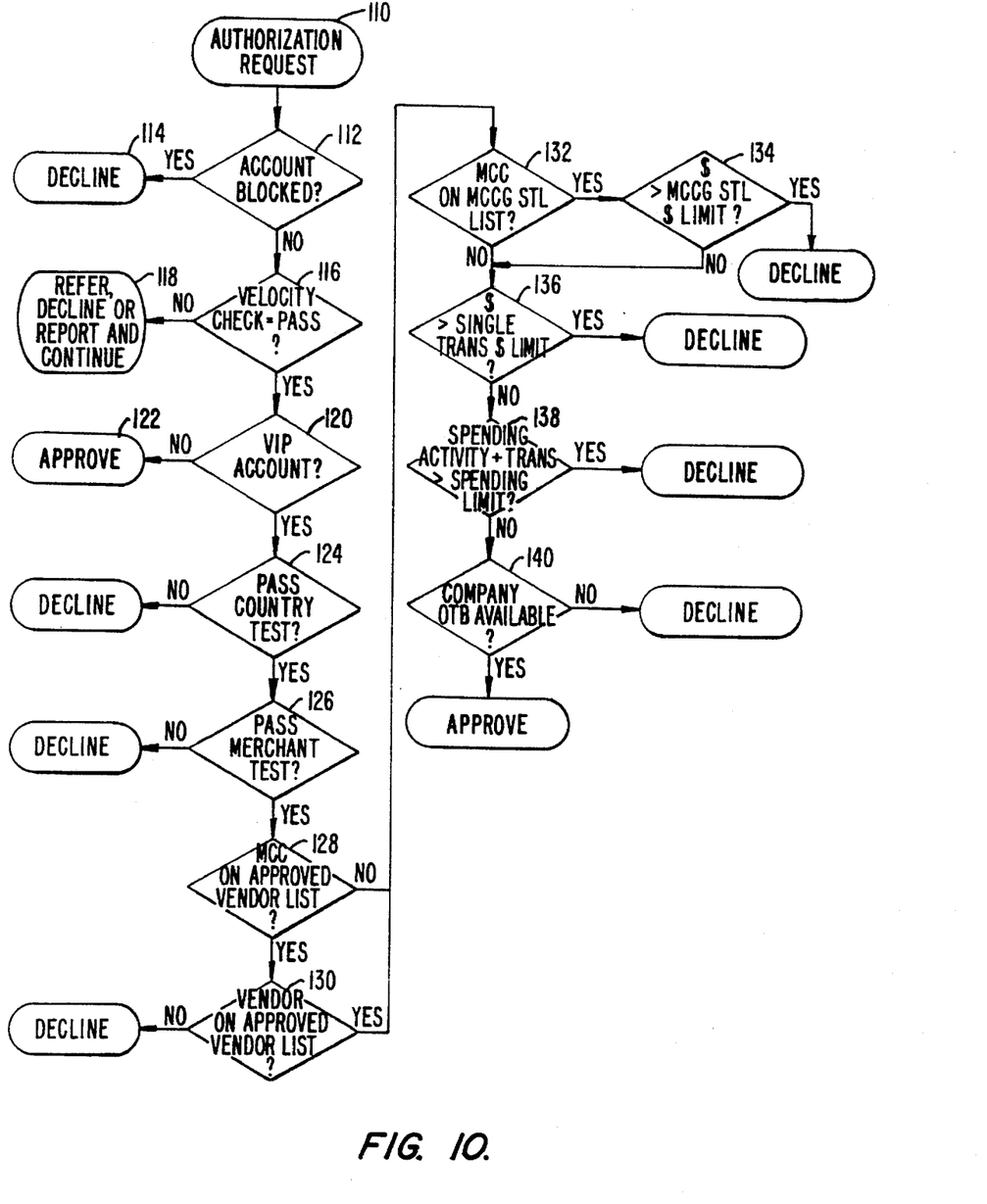
FIG. 10 is a flowchart of the software authorization tests for a procurement card according to the present invention.

FIG. 10 is a flowchart describing the software used for performing an exemplary series of tests for a credit card used for procurement purposes (a purchasing card). The tests are set up in order of priority. One advantage is that the most likely test to be failed would be performed first. In this way, an authorization response, if the authorization is to be denied, can be sent immediately back to the user waiting at the POS terminal. The software can then continue to process the rest of the tests and store them for reporting purposes. However, since the test has already been indicated as failing, there is no need to wait for the remaining tests to be performed before sending the authorization denial.

Another function of the priority set forth in FIG. 10 is that certain tests may be required for authorizing a transaction, while additional tests will not affect authorization, but are used for reporting purposes. The tests which are needed for authorization can be placed as the first several tests to be performed, so that the authorization response can be generated without waiting for the remaining tests which can be completed after the authorization response is sent.

In a particular example of FIG. 10, an authorization request is first received at step 110. A first test 112 is performed to determine if the account is blocked. If the account is blocked, a negative authorization response 114 can be generated.

Next, a velocity check can be performed (step 114). In the example shown, the response for a failed velocity check may be a referral of the authorization request to a live, human operator to ask some questions of the merchant (step 118). A VIP account test 120 determines if a particular account has been designated as a VIP account. If so, the remaining tests are not needed for authorization, since the VIP account would be usable for all the purposes set forth in the following tests. Thus, an approval message 122 would be immediately generated.

The next test could be a country test 124, which may limit the cardholder to particular countries. A test 126 determines whether the Standard Industrial Classification (SIC) code of the merchant is acceptable for the account. If it is not, the request will be declined. Test 126 can include or exclude specific SIC codes. A test 128 determines whether the merchant category code of the merchant is in a special grouping for that company. If it is not, subsequent test 130 can be bypassed. Test 130 determines if the particular vendor is on an approved vendor list for that SIC code. Certainly, if the merchant category is not approved, the particular vendor will not be and there is no need to perform test 130 if test 128 has failed.

Test 132 compares the merchant category code to a subset of approved SIC codes from test 126. If the code is in the approved grouping, separate test 134 may be used to determine if there is a special dollar limit for the particular code grouping which must be passed.

Test 136 is used to provide a single transaction limit for an authorization request. Test 138 allows a spending limit to be applied over a company-defined cycle, such as a monthly cycle or other billing cycle. Test 140 allows a company's open-to-buy limit to be applied (the available credit at the company level after deducting individual expenditures). This means that the authorization request, if approved to this point, must not cause the company credit line to be exceeded.

As mentioned before, depending upon the embodiment used, the different limit tests, (such as the spending limit) may be imposed not only at the cardholder level, but at each level above it. In one embodiment, the tests can be consolidated so that a single limit is actually stored in the individual cardholder account data. This consolidated limit test can be updated as any level above it is updated, with the update rippling down through the hierarchy.

Figure 11:
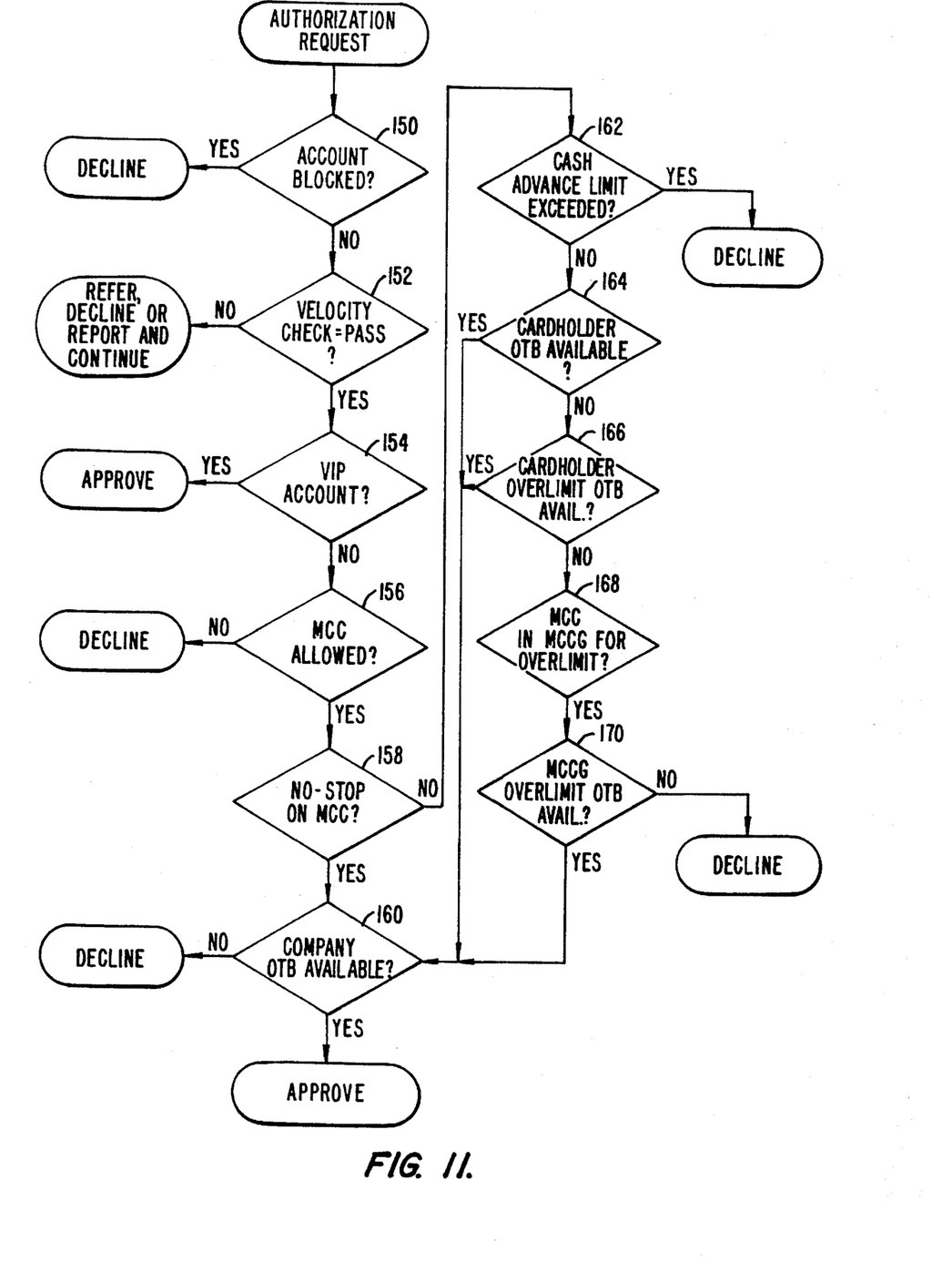
FIG. 11 is a flowchart of a software authorization test for a travel and entertainment card according to the present invention.

FIG. 11 is a flowchart illustrating the software order of tests for a corporate card used as a travel and entertainment card (T&E). In the system of FIG. 11, an account blocking test 150 is also used, followed by a velocity test 152. VIP account 154 follows in the same manner as for the purchasing card.

At this point, the order of the testing varies, with the merchant category code grouping test 156 following next. This is followed by no-stop test 158, which allows the bypassing of the remaining tests if there is no limit for this particular merchant category. If there is no limit, the software proceeds to a test 160 which determines whether there is sufficient available credit in the company's open to buy (OTB) to approve the request.

If there is not a no-stop provision on the merchant category code, the next test performed is test 162 for determining if there is a cash advance limit. If the cash advance limit is not exceeded, test 164 determines whether there is sufficient open-to-buy (OTB) at the cardholder level to approve the request. If there is not, it is determined whether there is a cardholder over-limit for the OTB. If there is an OTB overlimit and the overlimit amount or percentage of the credit line is sufficient to cover the amount of the authorization request, the test is passed. If not, over-limit tests can be provided for the merchant category grouping (tests 168 and 170).

The present invention also provides a unique reporting capability, with a separate reporting hierarchy. Not only can reports be defined according to a different hierarchial structure, but the reports can be configured according to the company's desired time cycle, not the bank's billing cycle. Thus, all the tests specified can be done over a period of time which conforms to the company standards. In addition, the hierarchies for authorizations, billing and reporting are all independent of each other.

Similarly, the billing hierarchy allows the company to control how it is billed in a similar manner to the reporting procedure, but with different hierarchial arrangements possible.

In one embodiment, the present invention provides for four additional reporting hierarchies to be used, with each account number having four possible pointers to the different hierarchies for reporting purposes. This allows special projects that cross organizational boundaries within a company to receive their own reports (e.g. Matrix Management).

Customer Service Features

The present invention allows a bank to use a single account record to represent an entire company. In the case where a company used both a Purchasing card product (used for purchasing only) and a Corporate card product (usable for travel and entertainment, optionally in combination with purchasing) from the same bank, the same company account can be used for both products or separate company accounts can be established for each product, at the option of the bank.

The present invention provides Customer Service Representatives (CSRs) with the ability to view corporate policy guidelines regarding authorization parameter override requests. This information is accessible on an ad hoc basis and can be requested and viewed through on-line screens.

From time to time it may become necessary for CSRs to initiate changes to accounts within a credit card processing system. Because of the hierarchical nature of the account data, a change to an account may affect other related accounts lower down in the hierarchy.

If a change will have an impact on accounts other than the one being directly changed, a warning message will be produced that will allow the CSR to understand the full implications of the change, e.g., "This change will restrict the merchant category code groups available to the following cardholders:".

The present invention provides banks and companies with the ability to view a graphical depiction of the hierarchical relationships established between the company's accounts. This graphical model can be viewed either in a hard copy form or as an on-line display.

A CSR has the ability to model mass changes and changes to defaults into the appropriate hierarchies to show the impact prior to committing the transaction for implementation.

The modeling facility allows the CSR to generate transactions by manipulating the graphical model (e.g., transporting a cardholder on the screen from one location in the model hierarchy to another will generate the necessary transaction to cause the cardholder account to be physically transferred within the account hierarchy).

The present invention allows the bank to establish a pre-defined structure, or "template" of typical hierarchies for use as a tool in setting up or changing accounts within large companies. These templates take the form of "sample" structures that are pre-set and can be manipulated.

Customer Contact Lists

The bank will have the option to establish, view and maintain three kinds of corporate contact information: Billing Contact, Administrative Contact, and Authorization Contact. Every cardholder account can be associated with a contact person of each type.

The billing contact can be recorded either on the billing account or on the cardholder account (if the account is subject to individual billing). The Name, Work Phone, and Work Address will be recorded. This data will be used by the bank's staff whenever questions of billing and payment are to be directed to the company.

The authorization contact can be recorded on any account(s) within the authorization hierarchy (including cardholder and company accounts). If no authorization contact is recorded on an account record, the contact recorded on the immediate authorizing account higher in the hierarchy will be used. The Name, Work Phone and Work address will be recorded.

This data will be used by the bank's CSR staff whenever questions regarding the permissibility of authorization overrides are to be directed to the company.

An administrative contact can be recorded on any of the company's reporting accounts in reporting hierarchy #1. If no administrative contact is recorded on a reporting account record, then the contact recorded on the next reporting account record higher in the hierarchy will be used. This data will be used by the bank's staff to direct general questions regarding the company's program to the company.

Account Maintenance Capabilities

The present invention provides the following unique capabilities for maintaining account data in a credit card system:

Effective Dates

Companies and banks have the option to control the date on which a change becomes effective. To accomplish this, account maintenance transactions include an effective date. This feature allows the company or bank to enter future or post dated transactions.

Although the transactions will be accepted and validated on the date they are entered, the changes will not become effective until the effective date. This gives the bank or company the option to input a group of changes (all intended to take effect on the same day) over a period of days in advance of their intended Effective Date (e.g. increases in the spending limits of selected employees targeted to coincide with the start of a new fiscal year).

Post dated transactions are allowed for dates within twelve months of the current date. These transactions allow the company to control history reporting in the aftermath of company reorganizations or acquisitions. The fields modified by these transactions are limited to those related to organizational structure.

Mass Updates

The company can initiate mass update transactions. They are used to modify the hierarchies to reflect changed conditions caused by reorganizations, acquisitions, sales, etc. Their chief characteristic is that a single transaction is capable of causing changes to a large number of account records at multiple levels within a hierarchy.

CSRs will be informed on-line of the impact of a mass update, which gives them the opportunity to cancel a transaction before the transaction is accepted.

The following is a non-exhaustive list containing examples of what can be accomplished with a single mass update transaction:

Reactivate all accounts in Department A which were deactivated on. Jan. 15, 1992.

Transfer all accounts in Department A to Department B.

Change the calendar month spending limit on all accounts.

Defaults

Certain data fields are subject to default processing. If no data is entered into an account for one of these fields, then the contents of that field will "default" to the values established at the next level up in the appropriate hierarchy. For authorization parameters the authorizing account will be the source of the defaults. The billing account will be the source of the defaults for billing parameters. A reporting account higher up in reporting hierarchy #1 will be the source of defaults for all other data elements.

The bank has the option to designate whether or not each given field is subject to default processing for a given company. If a field is subject to default processing and a value is entered into it by the CSR (both in the case when an individual account is added to an existing company, and in the case when an account is added as one of a group of accounts during new company set-up) it is considered to be an override of the default. Such an override only applies to that account, and to any accounts which are subordinate to it in the hierarchy.

In a field on an account which is above the cardholder level (i.e. above level 9 in the hierarchy) is subject to default processing, and a value is entered into it by the Customer Service Representative via a mass change or regular transaction, the new value applies to that account and to any accounts which are subordinate to it in the hierarchy for which default overrides are not in place on the field to be changed.

Whenever an account transfers to another portion of the hierarchy, the new default parameters for that portion of the hierarchy are assigned to the account. The only exception is in the case of fields which already were established on the account as default overrides prior to the transfer. In this case, the account is transferred with those existing parameters intact, and the account and its parameters will be reported to the bank or company on an exception report.

Double Custody

The bank is permitted to designate certain fields as requiring double-custody for modification. This means that two authorized CSRs must approve the change before it is accepted and applied.

Velocity Checking

Velocity checking is a risk management feature which banks use to prevent unauthorized use of a credit card when high levels of cardholder activity are noted. When a Visa account exceeds a pre-defined limit of transaction activity within a fixed period of time (e.g., daily), a bank may decline or refer an authorization request rather than approving it. A referral usually requires the merchant to call the bank to confirm the identity of the cardholder.

The present invention provides a set of unique responses to a request for authorization which has failed a velocity checking test. When a request for authorization causes a cardholder account to exceed one of its pre-established velocity limits (count or amount), the system will take one of three actions. The specific action taken by the system is based on options established for a company. The bank and company may define different options for Corporate card and Purchasing card programs.

The three options are:

Refer the Authorization Request

Decline the Authorization Request

Approve and Report the Authorization Request

The company may also elect to specify up to 9 merchant category code group(s) (MCCG) (for a company) and up to 9 country code groups (for a cardholder) with associated failed velocity actions. Each MCCG or country code group can be assigned a different option.

Merchant Category Code Groups.

The present invention allows a company to establish and maintain groups of related merchant category codes called merchant category code groups (MCCGs). MCCGs are lists of merchant category codes associated with a group code. These group codes can represent a series, range, and/or individual merchant category codes. The company has the option to establish up to 999 such MCCGs and assign them to account records within the company's authorization hierarchy.

MCCGs are recognized on account maintenance transactions as a shorthand method of referring to the entire set of associated codes. They are also displayed on screens and reports which are viewed by companies and/or the bank.

The present invention uses the values entered into the corporate level MCCG definitions to edit and interpret MCCGs assigned to an account record. Every MCCG assigned to an account record is edited in the context of all other MCCGs assigned to that account record. The purpose of this edit is to ensure that no mutually exclusive or contradictory MCCGs are assigned to the same account record for the same process.

The present invention controls the application of certain authorization parameters based on merchant category codes. Merchant category code groups are used at the cardholder level to explicitly define the merchant category codes that are applicable to those authorization parameters.

The following authorization parameters include unique capabilities which are based on merchant category code groups:

Included/Excluded Merchant Type

Single Transaction Amount Limit (Purchasing card only)

NO-Stop Processing (Corporate card only)

Over-Limit Amount (Corporate card only)

Failed Velocity Checking Action Code

Cash Advance Credit Limit (Corporate card only)

Diversion Account Processing

Included/Excluded Merchant Type

The present invention uses included/excluded merchant type processing to validate an incoming request for authorization. A request for authorization is allowed if the merchant category code that appears in the authorization request for a cardholder is contained in a MCCG assigned to the cardholder account and flagged as included.

A request for authorization is declined if the merchant category code that appears in the authorization request for a cardholder is contained in a MCCG assigned to the cardholder account and flagged as excluded. The company may establish up to 999 merchant category code groups of which 99 may be assigned to any given cardholder account for purposes of included/excluded merchant type processing.

Single Transaction Amount Limit & Single Transaction Amount Limit by MCCG

The present invention enhances the use of a single transaction amount limit to control the total currency value of any single request for authorization transaction. If the transaction amount of the request for authorization exceeds the single transaction amount limit on the cardholder account, the authorization request will be denied.

The present invention enhances the single transaction amount limit described above by using merchant category code group(s). The purpose of this feature is to allow certain types of merchants to have different (larger or smaller) single transaction amount limits than is permitted for the cardholder account in general. The company may assign up to 9 MCCGs to any given cardholder account for this purpose.

No-Stop Processing by MCCG

The present invention allows the company to specify certain cardholder accounts as "no-stop" for specific merchant category code groups. A cardholder account coded with the no-stop feature is free from limitations on available credit; but only for request for authorization transactions submitted by merchant types which are subject to this feature. The company may assign up to 9 MCCGs to any given cardholder account for this purpose.

Over-Limit Amount by MCCG

For certain corporate cardholder accounts, the bank may designate specific merchant category code groups as having a higher credit limit than the standard cardholder credit limit. For those designated merchant category code groups, the authorization amount may cause a cardholder to exceed his/her credit limit, but will not be allowed to exceed the sum of the cardholder's credit limit plus the MCCG over limit amount.

Failed Velocity Checking Action Code

When a request for authorization fails a velocity check (i.e., a pre-set parameter which limits the number or total amount of requests for authorization that can be approved within a specific time limit), the invention determines whether the MCC in the authorization request matches a merchant category code in the merchant category code groups defined for failed velocity situations. If a match is found, a failed velocity checking action code associated with the merchant category code is used to determine the appropriate action to take. Each MCCG or country code group can have a separate response option.

The purpose of this feature is to allow a corporate traveler to check into a hotel on an extended business trip when the request for authorization might otherwise fail the velocity test because of high but approved business use of the Corporate card.

The company may elect to specify up to 9 merchant category code groups at the corporate level with associated failed velocity checking action codes.

Cash Advance Credit Limit

In addition to controlling spending using the cardholder credit limit, the company may elect to control Corporate card spending by defining subsets of the cardholder credit limit. The most common reason to do this is to control cash advances. However, the feature (while called cash advance credit limit) is more broadly defined to include other merchant types beside ATMs and is based on a merchant category code group defined for this purpose.

Diversion Account Processing

Some authorization requests and transactions are "diverted" from the cardholder account and posted to a diversion account. The present invention uses merchant category code groups to select which types of transaction should be directed to a diversion account. This occurs when the merchant category code in the transaction matches a merchant category code in a merchant category code group flagged for diversion account processing.

Each cardholder account may have up to 9 merchant category code groups assigned to diversion accounts.

Country Code Groups

The present invention allows a company to establish and maintain groups of related country codes called country code groups (CCGs). CCGs are lists of country codes associated with a group code. These group codes can represent a series, range, and/or individual country codes. The company has the option to establish up to 99 such CCGs and assign them to account records within the company's authorization hierarchy.

CCGs are recognized on account maintenance transactions as a shorthand method of referring to the entire set of associated codes. They are also displayed on screens and reports which are viewed by companies and/or the bank.

The present invention uses the values entered into the company-level CCG definitions to edit and interpret CCGs assigned to an account record. Each CCG assigned to an account record is edited in the context of all other CCGs assigned to that account record. The purpose of this edit is to ensure that no mutually exclusive or contradictory group codes are assigned to the same account record.

The present invention controls the application of certain authorization parameters based on country codes. Country code groups are used at the cardholder level to explicitly define the country codes that are applicable to those authorization parameters.

The following authorization parameters include unique capabilities which are based on country code groups:

Included/Excluded country (Purchasing card only)

Failed Velocity Checking Action Code

Failed Velocity Checking Action Code for

Included/Excluded Country

Included/Excluded Country

The present invention uses included/excluded country processing to validate an incoming request for authorization on Purchasing cards. A request for authorization is allowed if the country code that appears in the authorization request for a cardholder is contained in a CCG assigned to the cardholder account and flagged as included.

A request for authorization is declined if the country code that appears in the authorization request for a cardholder is contained in a CCG assigned to the cardholder account and flagged as excluded. The company may establish up to 99 Country code groups, of which 9 may be assigned to any given cardholder account for purposes of included/excluded country processing.

Spending Limits

Spending limits are used in combination with the present invention to control spending activity for a Purchasing card over a specified period of time. The company sets a spending limit at the cardholder level (and any other levels in the authorization hierarchy) for each period it wishes to track.

There are four cycles available to the company to maintain spending limit activity. The company must choose at least one and up to four cycles. Cycles available are: Daily, Calendar Month, Billing Cycle and Company-Defined Cycle.

Unlike the other cycle options, the daily spending limit option is defined at the cardholder level only and is not available at other levels in the authorization hierarchy. A daily spending limit counter is used to accumulate spending. This counter is refreshed a the end of each 24-hour period.

Calendar Month spending limit, as it's name implies, is maintained based on a calendar month. A calendar month spending limit counter is refreshed (set to zero) at the end of the last day of the calendar month.

The Billing Cycle option is selected by companies who wish to tie their spending limit activity counter to their billing cycle. If the billing cycle option is selected, the spending limit activity counter is refreshed at the end of each billing cycle. The same rules used to determine the cut off date for billing purposes are used to refresh the spending limit activity counter.

With the company-defined cycle, the company has the option to define its own cycle based on available options from the issuer. Examples include: a weekly cycle of 4 weeks, 4 weeks, 5 weeks, Calendar Quarter, etc.

Spending limits always appear on the cardholder account, and (except for daily spending limits) may also be present on accounts at other levels in the authorization hierarchy.

The spending limit test is applied first to the cardholder account and then to any other accounts in the authorization hierarchy. All levels are checked even after it is determined that the authorization should be declined so that all decline reason codes may be recorded. This includes recording any decline reason codes encountered at higher levels in the hierarchy.

Maintaining Cardholder Spending Limit Activity Counters.

Cardholder spending limit counters are maintained as follows:

When an authorization request is approved, the amount of the authorization request will be added to the spending limit activity counter for each period being tracked and for all levels in the hierarchy. Spending limits are not updated as the result of matched authorization request and posting transactions.

When a transaction is not matched to an authorization request, the amount of the transaction will be added to the spending limit activity counter (for each period being tracked and for all levels in the hierarchy).

When unmatched authorization requests are aged off the transaction log, if the authorization request date falls within the period being tracked, the amount of the unmatched authorization request will be subtracted from the spending limit activity counter for each period being tracked and for all levels in the hierarchy.

Spending limit activity is not updated to include any disputed balances or credits.

Maintaining Spending Limit Activity Counters in the Hierarchy (above the Cardholder Level).

When an authorization hierarchy is present as it normally will be for Purchasing card authorization processing, spending limits and spending limit activity counters are present at all levels of the hierarchy. These activity counters are also updated during maintenance activities as described above.

Thresholds.

The present invention provides the bank with the unique ability to identify companies and/or cardholders whose available credit or spending has been reduced beyond a pre-established limit. This feature will detect situations that should be called to the attention of appropriate bank account management personnel and can generate a warning message. Two levels of threshold tests are provided for the cardholders of the company.

A warning message will be generated and presented on-line to authorized bank personnel when a given authorization request or unauthorized transaction reduces the company's available funds to within the threshold of the company's credit limit.

A warning message for Corporate cardholders will be generated when a given authorization request or unauthorized transaction has the effect of reducing the cardholder's available funds to within the threshold of the cardholder's credit limit.

For Purchasing Cardholders, a warning message will be generated when a given authorization request or unauthorized transaction reduces the unused portion of the spending limit to within the threshold of the spending limit. A threshold test will be performed for each spending limit cycle being measured on a cardholder account, and at all related higher levels in the authorization hierarchy.

An entry will be placed on the "Cardholder Threshold Exception Report" for each cardholder account meeting their threshold.

Flexible Billing Cycles.

The present invention allows the bank to control the frequency and specific date of billing for a company's accounts. The bank can select a separate billing cycle for each billing account and its associated cardholder accounts (for consolidated billing) or for each individual cardholder account which is individually billed. Each billing account will be tracked and aged and delinquencies reported for all of the above billing cycles except daily.

Unique Fees and Charges.

Each cardholder can be subject to up to 9 separate and unique fees and charges based on bank-defined fees and charges algorithms.

Separate and Unique Account Grace Periods.

The present invention allows the bank to define a separate grace period for an account. Late fees will be calculated for the billed account if payment is not received by the end of the grace period.

Reporting.

The present invention includes several unique reports:

The cardholder threshold exception report lists all accounts whose current balances equal or exceed a user-specified percentage (i.e., threshold) of their credit line or spending limit. The purpose of this report is to focus on cardholder spending patterns and to determine any anomalies with regard to cardholder spending limits. This report sets forth the account number, account name and address, current balance, charges, credit line or spending limit, percentage, and payments.

The company credit limit warning report identifies companies that have approached their threshold for the established credit line. The purpose of this report is to inform the company's account relationship manager that the company may be at risk of having authorizations declined. This report sets forth the company name and address, company contact, name, phone number and address, company billing account number, outstanding balance, company credit limit, available company credit limit, last payment date, last payment received, payment due, payment due date, and delinquency balance.

The velocity checking exception report lists all accounts which have exceeded the velocity checking limits. The purpose of this report is to focus on cardholder patterns and to determine any anomalies with regard to excessive cardholder velocity activity. This report includes the account number, account name and address, velocity checking rule violation code/description, number of authorization attempts for the period, (daily/monthly velocity limit counters), velocity limit for the period as defined for the account, and authorization response code (e.g., decline, referral, approval).

The excessive authorization activity report lists excessive authorization activity by cardholder within the company. (The criteria for "excessive" will be based on the velocity limits defined in the account authorization parameters). The purpose of this report is to highlight cardholder misuse of the system which may result from misunderstanding or abuse. This report includes the account number, transaction date, transaction time, response code, card acceptor ID, acquirer BIN, merchant category code, decline reasons, and authorization amount.

As will be understood by those familiar with the art, the present invention may be embodied in other specific forms without departing from the spirit or essential characteristics thereof. For example, different combinations or orders of tests could be used, or different numbers of variable hierarchies could be provided. Accordingly, the disclosure of the preferred embodiments of the invention is intended to be illustrative, but not limiting, of the scope of the invention which is sen forth in the following claims.

What is claimed is:

1. A method for authorizing transactions for distributing currency or purchasing goods and services, comprising the following steps:

generating a plurality of card numbers, each card number including an account number;

creating a database on a central computer having at least a first field for said account number;

assigning an authorization hierarchial position to each of said account numbers in said database; and creating a plurality of distinct authorization tests, said authorization tests varying according to the hierarchial position of an individual account number.

2. The method of claim 1 further comprising the steps of:

subsequently receiving, from a remote terminal, a transmitted card number and a debit amount;

determining a location of said database;

determining, from the transmitted account number in said transmitted card number, the hierarchial authorization tests applicable to said transmitted account number;

applying said hierarchial tests to said debit amount; and transmitting to said remote terminal an authorization message if said hierarchial tests are passed.

3. The method of claim 2 further comprising the steps of:

transmitting to said remote terminal a message in accordance with a predetermined failure response option if said hierarchial tests are failed.

4. The method of claim 1 further comprising the steps of:

creating groupings of merchant category codes;

creating different authorization tests according to said groupings of merchant category codes and said hierarchial authorization levels;

transmitting a merchant category code from said remote terminal with said transmitted card number; and applying said hierarchial tests corresponding to said the hierarchial level of said transmitted account number and said transmitted merchant category.

5. The method of claim 4 wherein one of said authorization tests is a velocity test which varies for different groupings of merchant category codes comprising the steps of:

recording the time of each transmission of a card number and a merchant category code;

determining a frequency of usage from previous recorded times of transmission for the card number and merchant category code grouping; and transmitting a message denying authorization if said frequency of usage is greater than a predetermined limit for said merchant category code grouping and said card number.

6. The method of claim 1 further comprising the step of assigning a default authorization test to an account number which does not have a separately assigned authorization test, said default authorization test being a corresponding test for a higher level in said authorization hierarchy from said account number.

7. The method of claim 6 further comprising the step of performing a mass update of all default authorization tests in response to a revision of said corresponding test.

8. A system for authorizing transactions for distributing currency or purchasing goods and services, comprising:

a plurality of cards, each card having a card number, each card number including an account number;

a central computer having a database with at least a first field for said account number, each account number being organized according to an authorization hierarchial position, said central computer having a plurality of distinct authorization tests, said authorization tests varying according to the hierarchial position of an individual account number;

means, in said central computer, for determining, from a received card number, a location of said database;

means, in said central computer, for determining, from the account number in said received card number, the hierarchial authorization tests applicable to said received account number; and means, in said central computer, for applying said hierarchial tests to a received debit amount.

9. The system of claim 8 further comprising:

a remote terminal for transmitting a transmitted card number and a debit amount;

a network coupling said remote terminal to said central computer; and a transmitter for transmitting to said remote terminal an authorization message if said hierarchial tests are passed and transmitting to said remote terminal a message in accordance with a predetermined failure response option if said hierarchial tests are failed.

10. The system of claim 8 wherein said central computer further comprises:

means for creating groupings of merchant category codes;

means for creating different authorization tests according to said groupings of merchant category codes and said hierarchial authorization levels;

means for transmitting a merchant category code from said remote terminal with said transmitted card number; and means for applying said hierarchial tests corresponding to said the hierarchial level of said transmitted account number and said transmitted merchant category.

11. The system of claim 10 wherein one of said authorization tests is a velocity test which varies for different groupings of merchant category codes comprising:

means for recording the time of each transmission of a card number and a merchant category code;

means for determining a frequency of usage from previous recorded times of transmission for the card number and merchant category code grouping; and means for transmitting a message denying authorization if said frequency of usage is greater than a predetermined limit for said merchant category code grouping and said card number.

12. The system of claim 8 further comprising means for assigning a default authorization test to an account number which does not have a separately assigned authorization test, said default authorization test being a corresponding test for a higher level in said authorization hierarchy from said account number.

13. The system of claim 12 further comprising means for performing a mass update of all default authorization tests in response to a revision of said corresponding test.

14. The system of claim 8 wherein said remote terminal transmits merchant information, and one of said hierarchial tests compares said merchant information to an approved vendor list.

* * * * *